(12) United States Patent
Remmels

(10) Patent No.: US 6,789,531 B1  
(45) Date of Patent: Sep. 14, 2004

(54) MULTIPLE-CYLINDER INTERNAL COMBUSTION ENGINE AND A METHOD FOR OPERATING THE SAME

(75) Inventor: Werner Remmels, Immenstaad (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 09/763,699

(22) PCT Filed: Aug. 21, 1999

(86) PCT No.: PCT/EP99/06138

§ 371 (c)(1),
(2), (4) Date: Jun. 1, 2001

(87) PCT Pub. No.: WO00/12884

PCT Pub. Date: Mar. 9, 2000

(30) Foreign Application Priority Data

Aug. 26, 1998 (DE) .......................... 198 38 725

(51) Int. Cl.[7] ............................... F02B 47/08
(52) U.S. Cl. .................. 123/568.11; 123/357; 60/605.2
(58) Field of Search .................... 123/568.11, 58.8, 123/357, 568.12, 568.17; 60/599, 605.2

(56) References Cited

U.S. PATENT DOCUMENTS

| | | | | |
|---|---|---|---|---|
| 4,131,095 A | * | 12/1978 | Ouchi | 123/58.8 |
| 4,142,492 A | * | 3/1979 | Kobayashi et al. | 60/278 |
| 4,179,892 A | * | 12/1979 | Heydrich | 60/605.2 |
| 5,121,734 A | * | 6/1992 | Grieshaber et al. | 123/568.17 |
| 5,178,119 A | * | 1/1993 | Gale | 123/568.12 |
| 5,423,302 A | * | 6/1995 | Glassey | 123/446 |
| 5,517,976 A | * | 5/1996 | Bachle et al. | 123/568.11 |
| 5,894,726 A | * | 4/1999 | Monnier | 60/274 |
| 6,009,709 A | * | 1/2000 | Bailey | 60/605.2 |
| 6,141,959 A | * | 11/2000 | Digeser et al. | 60/274 |
| 6,543,230 B1 | * | 4/2003 | Schmid | 60/605.2 |

FOREIGN PATENT DOCUMENTS

| | | |
|---|---|---|
| DE | 43 31 509 | 7/1994 |
| EP | 0 442 981 | 8/1991 |
| EP | 0 889 220 | 1/1999 |

* cited by examiner

Primary Examiner—Carl S. Miller  
(74) Attorney, Agent, or Firm—Crowell & Moring LLP

(57) ABSTRACT

An internal combustion engine and method of operating same is provided which includes a plurality of first cylinders and at least one second cylinder. The at least one second cylinder serves as an input cylinder in that a portion of the exhaust gas therefrom is fed by way of an exhaust gas recirculating system to carbureted fuel for the engine. The engine includes an injection system for injecting fuel into the first cylinders and into the at least one second cylinder. The injected fuel quantity of the at least one second cylinder is controlled independently of the injected fuel quantity of the first cylinders.

26 Claims, 3 Drawing Sheets

MULTIPLE-CYLINDER INTERNAL COMBUSTION ENGINE AND A METHOD FOR OPERATING THE SAME

This application claims the priority of German Patent Document 198 38 725.3, file Aug. 26, 1998, and PCT/EP99/06138 filed Aug. 21, 1999.

BACKGROUND AND SUMMARY OF THE INVENTION

The invention relates to a multi-cylinder internal-combustion engine and to a method of operating such an internal-combustion engine.

An effective measure for lowering nitrogen oxide emissions of internal-combust on engines consists of recirculating the exhaust gas. This is achieved by reducing the oxygen partial pressure in the fed fresh gas. Such a system is known, for example, from European Patent Document EP 0 442 981 B1 (corresponding U.S. Pat. No. 5,121,734). In the case of the internal-combustion engine illustrated there, the exhaust gas of an input cylinder is fed into a common intake manifold. A mixture of intake air and recirculated exhaust gas is therefore fed to all cylinders.

From the applicant's German Patent Document DE 43 31 509 C1 (corresponding U.S. Pat. No. 5,517,976), a divided engine with an exhaust gas recirculating system is also known. The divided engine consists of output cylinders, in the following called "first cylinders", and of at least one input cylinder, in the following called "second cylinder". In this case, the intake system is divided into two parts. The first cylinders receive a mixture of intake air and recirculated exhaust gas of the second cylinder. The second cylinder receives only intake air.

Based on the above-described prior art, it is an object of as the invention to further develop this prior art with respect to a further lowering of the nitrogen oxide emissions.

This object is achieved, on the one hand, by a method of operating a multi-cylinder internal-combustion engine and, on the other hand, by a multi-cylinder internal-combustion engine having certain characteristics, as set forth below:

(i) Method of operating an internal-combustion engine which has first cylinders and at least one second cylinder, the second cylinder serving as an input cylinder, in that a portion of the exhaust gas is fed by way of an exhaust gas recirculating system to the carbureted fuel, and having an injection system for injecting fuel into the first cylinders and the second cylinder of the internal combustion engine, characterized in that the controlling of the injected fuel quantity of the second cylinder takes place independently of the controlling of the injected fuel quantity of the first cylinders.

(ii) Internal-combustion engine which has first cylinders and at least one second cylinder, which second cylinder is used as an input cylinder in that a portion of the exhaust gas is fed to the carbureted gas by way of an exhaust gas recirculating system characterized in that an injection system is provided for injecting fuel into the first cylinders and into the second cylinder of the internal-combustion engine, the injection system permitting a mutually independent controlling of the injected fuel quantity of the first cylinders and of the second cylinder.

The method according to the invention provides for an internal-combustion engine of the above-mentioned type where the controlling of the injected fuel quantity of the second cylinder is independent of the controlling of the injected fuel quantity of the first cylinders.

It is an important advantage of he method according to the invention that, as a result of the independent control, a lowering of the nitrogen oxide emissions is permitted over a wide operating range, in which case the internal-combustion engine can simultaneously be operated in an optimal manner with respect to its power yield.

As a further development of the invention, it is suggested that the injection start and/or the injection duration of the fuel injection for the first cylinders and the second cylinder can be adjusted independently of one another.

For this purpose, the fuel quantity injected in the second cylinder is reduced for raising the partial oxygen pressure of the carbureted fuel fed to the first cylinders. Simultaneously, together with the reduction of the fuel quantity injected in the second cylinder, the fuel quantity injected in the first cylinders can be raised. The advantage consists of the fact that the reduction of the fuel usage for the input cylinder (second cylinder) is not, as in the case of a conventional exhaust gas recirculation with a reduction of the fuel usage for all cylinders, connected with a considerable reduction of the maximum combustion pressure. This is particularly advantageous in the case of supercharged engines, in which the reduction of the fuel usage at the few input cylinders influences the supercharging pressure only slightly and by the raising of the fuel quantity injected in the first cylinders (output cylinders), the total output of the internal-combustion engine is maintained. Another advantage consists of the fact that the stressing of the crankshaft of the internal-combustion engine increases only little as a result of the non-uniform loading because of different maximum combustion pressures in the cylinders.

In another embodiment, it is provided that, for lowering the partial oxygen pressure of the carbureted fuel fed to the first cylinders, the fuel quantity injected in the second cylinder is increased. And, as a further development of the latter, it is provided that, together with the raising of the fuel quantity injected in the second cylinder, the start of the injection of the fuel quantity into the second cylinder is shifted to late. A raising of the maximum combustion pressure of the input cylinder (second cylinder) can therefore be avoided despite the increase of the injected fuel quantity.

According to an advantageous further development of the process according to the invention, it is provided that, during acceleration operations of the internal-combustion engine, the fuel quantity injected in the second cylinder is reduced or the injection of fuel into the second cylinder is completely switched off. As a result, the soot formation during acceleration operations will not be additionally intensified by the exhaust gas recirculation.

According to another advantageous further development of the process according to the invention, it is provided that, in the idling operation of the internal-combustion engine, the fuel injection into the second cylinder is switched off. As a result, it is possible to avoid a sooting in the idling operation because of an undercooling of the exhaust gas flow below the dew point in the recirculation pipe train.

According to certain preferred embodiments of the invention, the controlling of the partial oxygen pressure of the carbureted fuel fed to the first cylinders takes place as a function of one or several of the following values in the characteristic diagram of the internal-combustion engine operation: Cylinder pressure, concentration of exhaust gas constituents, particularly NOx, HC, CO, exhaust gas temperature, engine torque, fuel usage, supercharging pressure, rotational engine speed.

For implementing the method according to the invention, it is suggested according to certain preferred embodiments of the invention that the injection of the fuel takes place by means of a common rail injection system. This injection system has a common preliminary storage device for storing pressurized fuel. The common preliminary storage device is connected by way of injection pipes with fuel injectors for injecting the fuel into the cylinders of the internal-combustion engine. For controlling the fed fuel quantity, a control unit is provided.

As an alternative thereto, an injection system may also be provided in which an individual storage device is assigned to each fuel injector. This fuel injector, in turn, is supplied with fuel by way of a distributor pipe by a common supply line. Also in this case, the controlling so the injection is carried out by the control unit.

The invention will be explained by means of the illustrated embodiments.

DETAILED DESCRIPTION OF THE DRAWINGS

Figure 1:
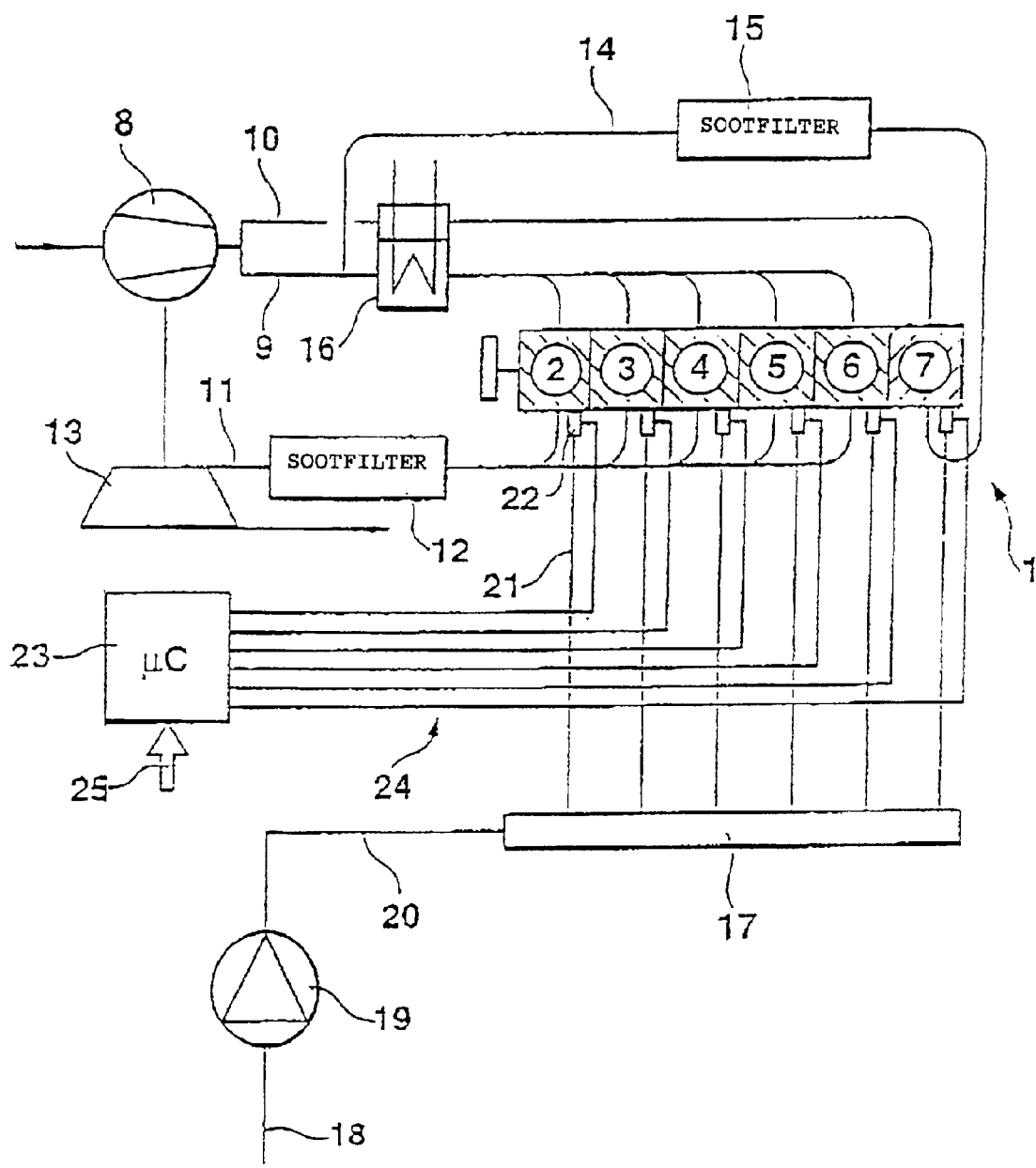
FIG. 1 is a system diagram for an internal-combustion engine with a divided fresh air supply.

FIG. 1 is a system diagram for an internal-combustion engine. The internal-combustion engine 1 has a number of—specifically 5, first cylinders 2 to 6 (output cylinders) and at least one second cylinder 7 (input cylinder). On their inlet side, the first cylinders 2 to 6 are connected with an intake manifold 9 by way of which they are supplied with carbureted fuel. On its inlet side, the second cylinder 7 is connected with a second intake pipe 10 separated from the intake manifold 9. Air compressed by an intake air compressor 8 of an exhaust gas turbocharger, which intake air compressor 8 is coupled with an exhaust gas turbine 13, is fed to the intake air manifold 9 and the intake pipe 10. On the outlet side, the first cylinders 2 to 6 are connected with an exhaust gas system 11 which, with the interposition of a soot filter 12, is connected to the exhaust gas turbine 13 of the exhaust gas turbocharger. The second cylinder 7 is connected on its outlet side by way of an exhaust gas recirculation system 14, into which a soot filter 15 is also connected, with the intake manifold 9 of the first cylinders 2 to 6. Downstream of the mouth of the exhaust gas recirculating system 14 into the intake manifold 9 as well as into the intake pipe 10, a charge air cooler 16 is connected.

Each of the cylinders 2 to 7 of the internal-combustion engine 1 is equipped with a fuel injector 22 which is coupled in each case with a common preliminary storage device 17 of a common rail fuel injection system. In the preliminary storage device 17, a highly pressurized fuel is stored which, by means of a high-pressure pump 19 is pumped from a fuel pipe 18 by way of a high-pressure pipe 20 to this common preliminary storage device 17. A control unit 23 is used for controlling the injection intervals, specifically the injection start, the injection duration, and the injection end, of the fuel injectors 22 which are each connected by way of control lines 24 to the control unit 23.

The control unit 23 controls the injected fuel quantity for each of the cylinders 2 to 7 of the internal-combustion engine 1 corresponding to its operating condition. In particular, the control unit 23 is constructed such that it controls the fuel quantity injected in the second cylinder 7 independently of the fuel quantity in each case injected in the first cylinders 2 to 6. In this case, the injection start and/or the injection duration and thus also the injection end of the fuel injection for the first cylinders 2 to 6 and the second cylinder 7 are adjusted independently of one another. For the purpose of raising the partial oxygen pressure of the carbureted fuel fed to the first cylinders 2 to 6 (output cylinders), the fuel quantity injected into the second cylinder 7 (input cylinder) is reduced so that the exhaust gas quantity emitted by the second cylinder 7 and recirculated by way of the exhaust gas recirculating system 14 to the intake manifold 9 becomes smaller. Simultaneously with the reduction of the fuel quantity fed to the second cylinder 7 for the injection, the fuel quantity injected in the first cylinders 2 to 6 is increased so that the total output of the internal-combustion engine is maintained. In particular, as a result, the maximum combustion pressure of the internal-combustion engine and thus the pressure at the exhaust gas turbocharger is maintained to be essentially constant. The crankshaft of the internal-combustion engine is only slightly additionally loaded by the non-uniform loading because of different maximum combustion pressures in the cylinders.

On the other hand, for lowering the partial oxygen pressure of the carbureted fuel fed to the first cylinders 2 to 6 (output cylinders), the fuel quantity injected in the second cylinder 7 (input cylinder) is raised, whereby the exhaust gas quantity is increased which is recirculated from the output side of the second cylinder 7 by way of the exhaust gas recirculating system 14 to the intake manifold 9. By means of the shifting of the start of the injection of the fuel quantity into the second cylinder 7 to late, together with the increase of the fuel quantity injected into the second cylinder 7, an increase of the maximum combustion pressure of the input cylinder can be compensated.

For reducing the soot formation, during acceleration operations of the internal-combustion engine, the fuel quantity injected into the second cylinder 7 can be reduced or completely switched off. During the idling operation, the fuel injection into the second cylinder 7 can also be switched off, in order to prevent a sooting of the exhaust gas recirculating system 14 including the soot filter 15 by undercooling the exhaust gas flow below the dew point.

Figure 2:
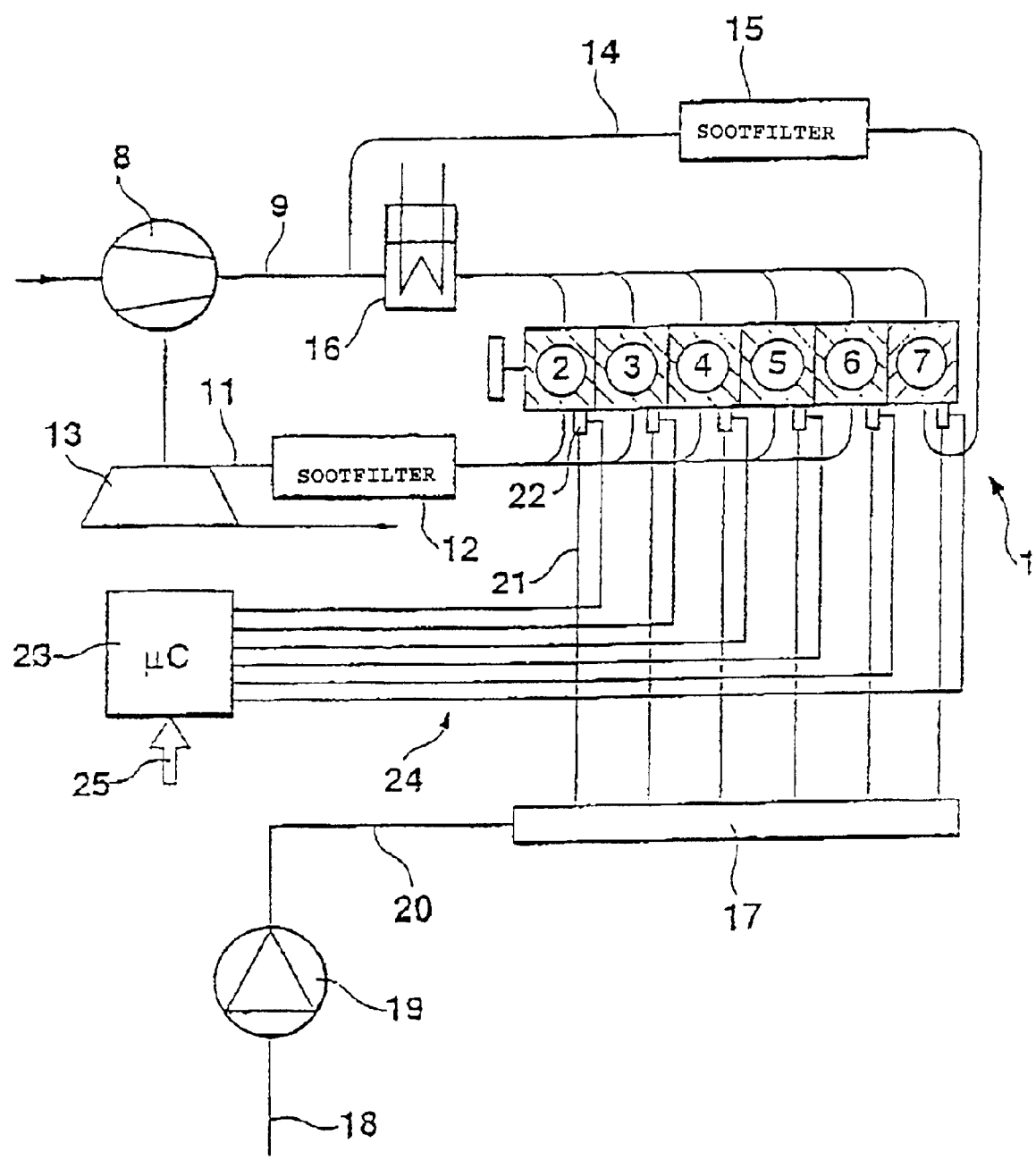
FIG. 2 is a system diagram for an internal-combustion engine with a common fresh air supply.

FIG. 2 is a system diagram for an internal-combustion engine with a common fresh air supply for implementing the method according to the invention. Components which are identical to these of FIG. 1 are provided with the same reference numbers. The difference with respect to FIG. 1 consists of the fact that here the first cylinders 2 to 6 as well as the second cylinder 7 are supplied with carbureted fuel by way of the intake manifold. The exhaust gas recirculating system 14 coupled with the second cylinder 7 leads via soot filters 15 into this intake manifold 9. The statements made with respect to FIG. 1 apply to the implementation of the method.

Figure 3:
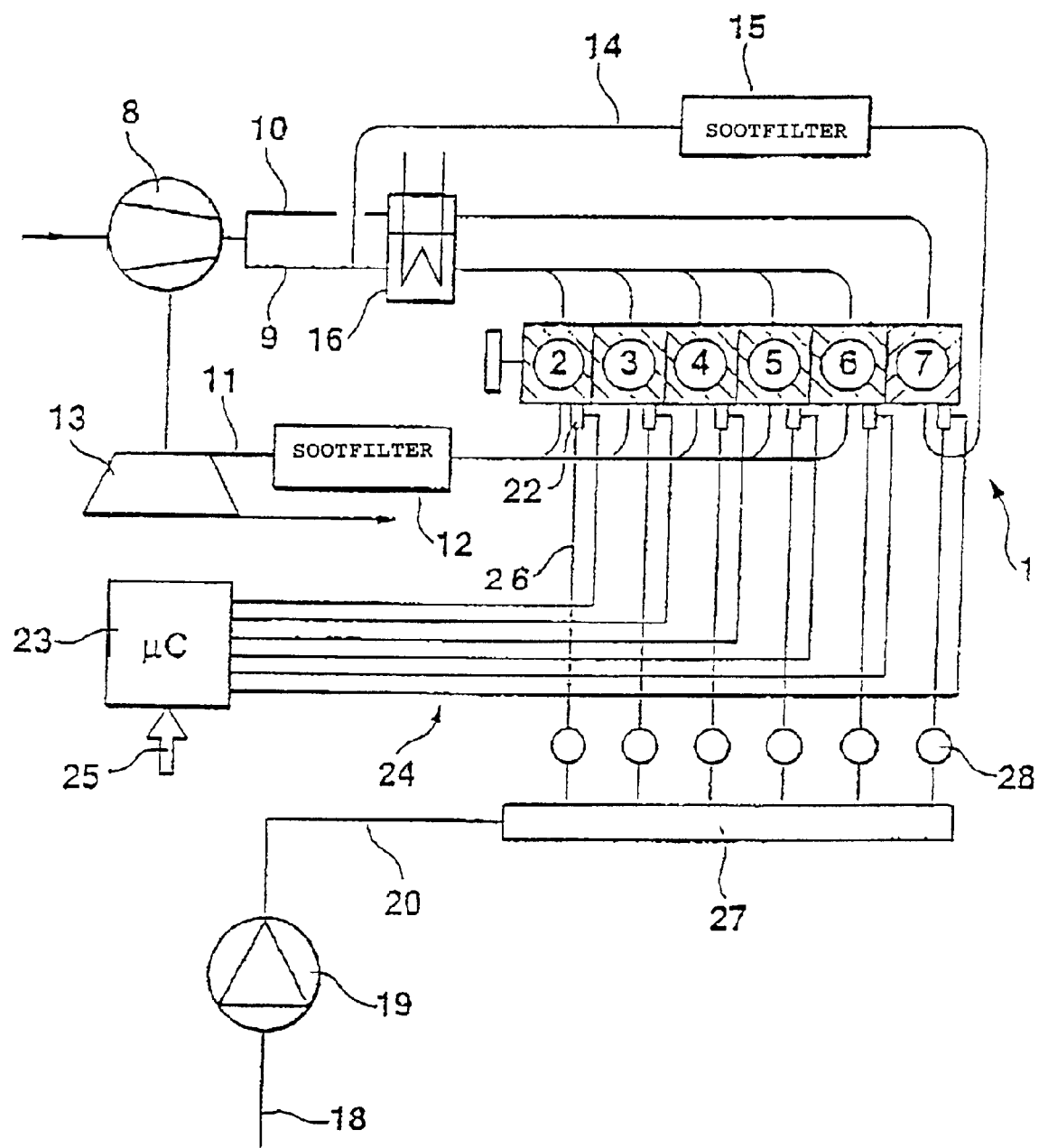
FIG. 3 is a system diagram for an internal-combustion engine with a divided fresh air supply and individual storage devices.

FIG. 3 is a system diagram for an internal-combustion engine with a divided fresh air supply and an individual storage device. The components which are identical to those of FIGS. 1 and 2 are provided with the same reference numbers. A common supply line 27 is fed by the high-pressure pump 19. From the common supply line 27, two distributor lines 26 branch off to the fuel injectors 22. Individual storage devices 28 are provided in these distributor lines 26. FIG. 3 illustrates a divided mixture feeding consisting of an intake manifold 9 and a suction pipe 10. Naturally, the injection system consisting of the common supply line 27, distributor lines 26 and individual storage devices 28 can be applied to the system illustrated in FIG. 2 with a common intake manifold. The statements made with respect to FIG. 1 apply to the implementation of the method and the function.

The control of the partial oxygen pressure in the first cylinders 2 to 6 by way of the regulating of the fuel quantity fed to the second cylinder 7 takes place in the steady-state as well as the transient engine operation in the characteristic diagram as a function of the relevant engine operating values. These can be:

The cylinder pressure (measurement by means of a pressure sensor in the cylinder) and/or concentration of exhaust gas constituents, such as NOx, HC, CO, etc. (measurement by means of a gas concentration sensor) and/or exhaust gas temperature (measurement by means of a temperature sensor in the exhaust gas pipe train) and/or engine torque (measurement by means of a torque sensor) and/or fuel usage (measurement by means of a fuel flow rate sensor) and/or supercharging pressure (measurement by means of a pressure sensor) and/or rotational engine speed sensor (measurement by means of a rotational speed sensor on the crankshaft), charge air temperature (temperature sensor in the fresh air supply pipe).

In the transient engine operation, the injected fuel quantity can also be controlled as a function of the above-mentioned values.

These input values 25 are detected in the control unit 23. On this basis, the control unit 25 determines the parameters required for the operation of the internal-combustion engine 1.

| List of Reference Numbers | |
|---|---|
| 1 | Internal-combustion engine |
| 2 | first cylinder |
| 3 | first cylinder |
| 4 | first cylinder |
| 5 | first cylinder |
| 6 | first cylinder |
| 7 | second cylinder |
| 8 | intake air compressor |
| 9 | intake manifold |
| 10 | intake pipe |
| 11 | exhaust gas system |
| 12 | soot filter |
| 13 | exhaust gas turbine |
| 14 | exhaust gas recirculating unit |
| 15 | soot filter |
| 16 | charge air cooler |
| 17 | common on preliminary storage device |
| 18 | fuel line |
| 19 | high pressure pump |
| 20 | high pressure pipe |
| 21 | injection line |
| 22 | fuel injector |
| 23 | control unit |
| 24 | control line |
| 25 | input values |
| 26 | distributor |
| 27 | common supply line |
| 28 | individual storage device |

What is claimed is:

1. Method of operating an internal-combustion engine which has a plurality of first cylinders and at least one second cylinder, the at least one second cylinder serving as an input cylinder, in that a portion of the exhaust gas from the at least one second cylinder is fed by way of an exhaust gas recirculating system to an intake air to produce an air/fuel mixture for the first cylinders, said engine also having an injection system for injecting fuel into the first cylinders and into the at least one second cylinder, said method comprising controlling of the injected fuel quantity of the at least one second cylinder independently of the controlling of the injected fuel quantity of the first cylinders, wherein for raising the partial oxygen pressure of the air/fuel mixture fed to the first cylinders, the fuel quantity is reduced which is injected into the at least one second cylinder.

2. Method of operating an internal-combustion engine which has a plurality of first cylinders and at least one second cylinder, the at least one second cylinder serving as an input cylinder, in that a portion of the exhaust gas from the at least one second cylinder is fed by way of an exhaust gas recirculating system to an intake air to produce an air/fuel mixture for the first cylinders, said engine also having an injection system for injecting fuel into the first cylinders and into the at least one second cylinder, said method comprising controlling of the injected fuel quantity of the at least one second cylinder independently of the controlling of the injected fuel quantity of the first cylinders, wherein said controlling of the injected fuel quantity includes independently adjusting at least one of the injection start and the injection duration of the fuel injection for the first cylinders and for the at least one second, wherein together with the reduction of the fuel quantity injected into the at least one second cylinder, the fuel quantity is raised which is injected into the first cylinders.

3. Method of operating an internal-combustion engine which has a plurality of first cylinders and at least one second cylinder, the at least one second cylinder serving as an input cylinder, in that a portion of the exhaust gas from the at least one second cylinder is fed by way of an exhaust gas recirculating system to an intake air to produce an air/fuel mixture for the first cylinders, said engine also having an injection system for injecting fuel into the first cylinders and into the at least one second cylinder, said method comprising controlling of the injected fuel quantity of the at least one second cylinder independently of the controlling of the injected fuel quantity of the first cylinders, wherein for lowering the partial oxygen pressure of the air/fuel mixture fed to the first cylinders, the fuel quantity is increased which is injected into the at least one second cylinder.

4. Method according to claim 3, wherein said controlling of the injected fuel quantity includes independently adjusting at least one of the injection start and the injection duration of the fuel injection for the first cylinders and for the at least one second.

5. Method according to claim 3, wherein together with the increasing of the fuel amount injected into the at least one second cylinder, the start of the injection of the fuel amount into the at least one second cylinder is shifted to late.

6. Method according to claim 4, wherein together with the increasing of the fuel amount injected into the at least one second cylinder, the start of the injection of the fuel amount into the at least one second cylinder is shifted to late.

7. Method of operating an internal-combustion engine which has a plurality of first cylinders and at least one second cylinder, the at least one second cylinder serving as an input cylinder, in that a portion of the exhaust gas from the at least one second cylinder is fed by way of an exhaust gas recirculating system to an intake air to produce an air/fuel mixture for the first cylinders, said engine also having an injection system for injecting fuel into the first cylinders and into the at least one second cylinder, said method comprising controlling of the injected fuel quantity of the at least one second cylinder independently of the controlling of the injected fuel quantity of the first cylinders, wherein during acceleration operations of the internal-combustion engine, the fuel amount injected into the at least one second cylinder is one of reduced and switched off completely.

8. Method according to claim 7, wherein said controlling of the injected fuel quantity includes independently adjusting at least one of the injection start and the injection duration of the fuel injection for the first cylinders and for the at least one second.

9. Method according to claim 1, wherein during acceleration operations of the internal-combustion engine, the fuel amount injected into the at least one second cylinder is one of reduced and switched off completely.

10. Method of operating an internal-combustion engine which has a plurality of first cylinders and at least one second cylinder, the at least one second cylinder serving as an input cylinder, in that a portion of the exhaust gas from the at least one second cylinder is fed by way of an exhaust gas recirculating system to an intake air to produce an air/fuel mixture for the first cylinders, said engine also having an injection system for injecting fuel into the first cylinders and into the at least one second cylinder, said method comprising controlling of the injected fuel quantity of the at least one second cylinder independently of the controlling of the injected fuel quantity of the first cylinders, wherein the fuel injection of the at least one second cylinder is switched off in the idling operation of the internal-combustion engine.

11. Method according to claim 10, wherein said controlling of the injected fuel quantity includes independently adjusting at least one of the injection start and the injection duration of the fuel injection for the first cylinders and for the at least one second.

12. Method according to claim 1, wherein the fuel injection of the at least one second cylinder is switched off in the idling operation of the internal-combustion engine.

13. Method according to claim 7, wherein the fuel injection of the at least one second cylinder is switched off in the idling operation of the internal-combustion engine.

14. Method according to claim 1, wherein controlling of the partial oxygen pressure of the carbureted gas fed to the first cylinders takes place as a function of at least one of the following values in the characteristic diagram of the internal-combustion engine operation:
  (i) cylinder pressure,
  (ii) concentration of exhaust gas constituents, particularly NOx, HC, CO,
  (iii) exhaust gas temperature,
  (iv) engine torque,
  (v) fuel usage,
  (vi) supercharging pressure, and
  (vii) rotational engine speed.

15. Method of operating an internal-combustion engine which has a plurality of first cylinders and at least one second cylinder, the at least one second cylinder serving as an input cylinder, in that a portion of the exhaust gas from the at least one second cylinder is fed by way of an exhaust gas recirculating system to an intake air to produce an air/fuel mixture for the first cylinders, said engine also having an injection system for injecting fuel into the first cylinders and into the at least one second cylinder, said method comprising controlling of the injected fuel quantity of the at least one second cylinder independently of the controlling of the injected fuel quantity of the first cylinders, wherein the injection of the fuel takes place by means of a common rail injection system which has a common preliminary storage device for storing highly pressurized fuel and fuel injectors connected with the common preliminary storage device by way of injection lines, for injecting fuel into the cylinders of the internal-combustion engine and a control unit for controlling the fuel quantity fed to the cylinders for the injection, the controlling of the injection of the fuel quantity fed to the at least one second cylinder being carried out by the control unit independently of the injection of the fuel quantity fed to the first cylinders.

16. Method according to claim 15, wherein said controlling of the injected fuel quantity includes independently adjusting at least one of the injection start and the injection duration of the fuel injection for the first cylinders and for the at least one second.

17. Method according to claim 1, wherein the injection of the fuel takes place by means of a common rail injection system which has a common preliminary storage device for storing highly pressurized fuel and fuel injectors connected with the common preliminary storage device by way of injection lines, for injecting fuel into the cylinders of the internal-combustion engine and a control unit for controlling the fuel quantity fed to the cylinders for the injection, the controlling of the injection of the fuel quantity fed to the at least one second cylinder being carried out by the control unit independently of the injection of the fuel quantity fed to the first cylinders.

18. Method of operating an internal-combustion engine which has a plurality of first cylinders and at least one second cylinder, the at least one second cylinder serving as an input cylinder, in that a portion of the exhaust gas from the at least one second cylinder is fed by way of an exhaust gas recirculating system to an intake air to produce an air/fuel mixture for the first cylinders, said engine also having an injection system for injecting fuel into the first cylinders and into the at least one second cylinder, said method comprising controlling of the injected fuel quantity of the at least one second cylinder independently of the controlling of the injected fuel quantity of the first cylinders, wherein the injection of the fuel takes place by means of a common rail injection system which, for each fuel injector, has an individual storage device for storing pressurized fuel, the individual storage device being connected by way of a distributor line with a common supply line, and has a control unit for controlling the fuel quantity fed to the cylinders for the injection, the controlling of the injection of the fuel quantity fed to the at least one second cylinder by the control unit taking place independently of the injection of the fuel quantity fed to the first cylinders.

19. Method according to claim 18, wherein said controlling of the injected fuel quantity includes independently adjusting at least one of the injection start and the injection duration of the fuel injection for the first cylinders and for the at least one second.

20. Method according to claim 1, wherein the injection of the fuel takes place by means of a common rail injection system which, for each fuel injector, has an individual storage device for storing pressurized fuel, the individual storage device being connected by way of a distributor line with a common supply line, and has a control unit for controlling the fuel quantity fed to the cylinders for the injection, the controlling of the injection of the fuel quantity fed to the at least one second cylinder by the control unit taking place independently of the injection of the fuel quantity fed to the first cylinders.

21. Method of operating an internal-combustion engine which has a plurality of first cylinders and at least one second cylinder, the at least one second cylinder serving as an input cylinder, in that a portion of the exhaust gas from the at least one second cylinder is fed by way of an exhaust gas recirculating system to an intake air to produce an air/fuel mixture for the first cylinders, said engine also having an injection system for injecting fuel into the first cylinders and into the at least one second cylinder, said method comprising controlling of the injected fuel quantity of the at least one second cylinder independently of the controlling of the injected fuel quantity of the first cylinders, wherein the engine has one second cylinder.

22. Method according to claim 21, wherein the engine has five first cylinders.

23. Internal-combustion engine which has a plurality of first cylinders and at least one second cylinder, which at least one second cylinder is used as an input cylinder in that a portion of the exhaust gas therefrom is fed to the an intake air to produce an air/fuel mixture for the first cylinders by way of an exhaust gas recirculating system, wherein an injection system is provided for injecting fuel into the first cylinders and into the at least one second cylinder, the injection system permitting a mutually independent controlling of the injected fuel quantity of the first cylinders and of the at least one second cylinder, wherein the injection system of the internal-combustion engine is constructed as a common rail injection system, which as a common preliminary storage device for storing highly pressurized fuel, and fuel injectors connected by way of injection lines with the common preliminary storage device for injecting the fuel into the cylinders of the internal-combustion engine, as well as a control unit for controlling the injection of the fuel quantity fed to the cylinders, the control unit being constructed for controlling the injection of the fuel quantity fed to the at least one second cylinder independently of the injection of the fuel quantity fed to the first cylinders.

24. Internal-combustion engine which has a plurality of first cylinders and at least one second cylinder, which at least one second cylinder is used as an input cylinder in that a portion of the exhaust gas therefrom is fed to the an intake air to produce an air/fuel mixture for the first cylinders by way of an exhaust gas recirculating system, wherein an injection system is provided for injecting fuel into the first cylinders and into the at least one second cylinder, the injection system permitting a mutually independent controlling of the injected fuel quantity of the first cylinders and of the at least one second cylinder, wherein the injection system comprises fuel injectors, individual storage devices for storing highly pressurized fuel, distributor lines and a common supply line and a control unit, wherein an individual storage device is assigned to each fuel injector, the individual storage device being connected by way of a respective distributor line with the common supply line, and wherein the control unit is constructed such that a controlling of the injection of the fuel quantity fed to the at least one second cylinder takes place independently of the injection of the fuel quantity fed to the first cylinders.

25. Internal-combustion engine according to claim 23, wherein for controlling the injection of the fuel quantity injected into the at least one second cylinder and the injection of the fuel quantity injected into the first cylinders, at least one sensor is provided which, for feeding their output signals are coupled with the control unit, said at least one sensor including at least one of:

(i) a pressure sensor in the cylinder, (ii) a gas concentration sensor for exhaust gas constituents, (iii) a temperature sensor in the exhaust gas pipe train, (iv) a torque sensor, (v) a fuel flow rate sensor, (vi) a pressure sensor for the supercharging pressure, and (vii) a rotational speed sensor on the crankshaft.

26. Internal-combustion engine according to claim 24, wherein for controlling the injection of the fuel quantity injected into the at least one second cylinder and the injection of the fuel quantity injected into the first cylinders, at least one sensor is provided which, for feeding their output signals are coupled with the control unit, said at least one sensor including at least one of:

(i) a pressure sensor in the cylinder, (ii) a gas concentration sensor for exhaust gas constituents, (iii) a temperature sensor in the exhaust gas pipe train, (iv) a torque sensor, (v) a fuel flow rate sensor, (vi) a pressure sensor for the supercharging pressure, and (vii) a rotational speed sensor on the crankshaft.

* * * * *